United States Patent
Marchadier et al.

(10) Patent No.: US 7,118,702 B2
(45) Date of Patent: Oct. 10, 2006

(54) TIRE MOLD

(75) Inventors: Denis Marchadier, Gerzat (FR); Alain Soulalioux, Saint-Beauzire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 105 days.

(21) Appl. No.: 10/425,526

(22) Filed: Apr. 29, 2003

(65) Prior Publication Data

US 2003/0218276 A1    Nov. 27, 2003

(30) Foreign Application Priority Data

Apr. 29, 2002   (FR) .................................. 02 05397

(51) Int. Cl.
   *B29C 33/10*   (2006.01)
   *B29C 35/00*   (2006.01)
   *B60C 11/00*   (2006.01)

(52) U.S. Cl. .................. 264/326; 152/209.15; 425/39; 425/46; 425/47; 425/812

(58) Field of Classification Search ........... 152/209.15; 425/812, 28.1, 39, 46, 47; 264/315, 326
See application file for complete search history.

(56) References Cited

U.S. PATENT DOCUMENTS

| 4,691,431 | A | | 9/1987 | Hayata |
| 5,234,326 | A | * | 8/1993 | Galli et al. ................. 425/812 |
| 5,276,223 | A | | 1/1994 | Ohno et al. |
| 5,466,475 | A | | 11/1995 | Yamasaki et al. |
| 5,492,669 | A | | 2/1996 | Laurent et al. |
| 5,656,107 | A | | 8/1997 | Laurent et al. |
| 5,798,076 | A | * | 8/1998 | Ladouce ..................... 425/612 |
| 5,980,810 | A | | 11/1999 | Ladouce |
| 6,017,206 | A | * | 1/2000 | Soulalioux ................... 425/46 |
| 6,044,680 | A | | 4/2000 | Pegoraro |
| 6,058,757 | A | | 5/2000 | Laurent et al. |

FOREIGN PATENT DOCUMENTS

| EP | 0569909 | | 11/1993 |
| EP | 0860260 | | 8/1998 |
| EP | 0916419 | | 5/1999 |
| EP | 0916421 | | 5/1999 |
| EP | 1043136 | * | 10/2000 |
| JP | 2-295706 | * | 12/1990 |
| JP | 11-300746 | * | 11/1999 |
| JP | 2002-2224 | * | 1/2002 |
| WO | WO 2004/052589 | * | 6/2004 |

* cited by examiner

*Primary Examiner*—Steven D. Maki
(74) *Attorney, Agent, or Firm*—Cohen, Pontani, Lieberman & Pavane (57) ABSTRACT

The tire mold comprises a laminated peripheral crown having a stack in the circumferential direction of a plurality of thin sheets. Cutouts distributed over several adjacent sheets increase the venting ability of the mold.

13 Claims, 7 Drawing Sheets fig. 1 fig. 2 fig. 3 fig. 4 fig. 5A fig. 5B fig. 6

TIRE MOLD

BACKGROUND OF THE INVENTION

The present invention concerns the manufacture of tires. More particularly, it relates to the process of molding tire treads, molds used in the process of molding tire treads, and tires produced using such molds.

U.S. Pat. No. 5,492,669 and EP 0 569 909 describe a type of mold in which a very large number of molding elements, in the form of sheets that are arranged transversely. The molding surface consists of the juxtaposed group of borders or edges of each sheet. Because the sheets are orientated transversely, they extend from one shoulder of the tire to the other. U.S. Pat. No. 5,980,810 and EP 0 860 260 propose to maintain the orientation of the sheets as perfectly radially as possible through the use of intermediate sheets, which are themselves engaged in slits machined into a supporting ring, and which are therefore guided rigorously.

Particularly with certain types of tread pattern, the venting of such molds can prove to be locally inadequate. The sheets of the mold can gradually become clogged as more and more tire fabrication cycles are carried out. This progressively reduces the venting ability of the mold, making it necessary to clean the mold regularly in order to guarantee the quality of the appearance of the tires produced.

Furthermore, the opening and closing of molds of this type requires coordinated movement in a radial direction, of all the sheets which, together, form a laminated peripheral crown. Parasitic frictional effects can oppose the opening and closing movements of the mold. In addition, it can prove difficult to maintain a regular distribution of the clearances between sheets. Consequently, molding burrs can appear in places where the clearance between sheets has become larger than the nominal clearance. One objective is to choose the nominal clearance, as explained in patent U.S. Pat. No. 5,492,669, specifically to prevent the rubber from flowing between the sheets at any time during the closure of the mold.

OBJECTS OF THE INVENTION

An object of the present invention is to overcome at least some of the aforementioned disadvantages, in order to improve the ability of a mold of this type to mold tires with a high-quality appearance, especially with a quality of appearance that remains constant after many molding cycles.

Another object of the invention is to facilitate the assembly of a mold, whose design entails manipulating a very large number of sheets with the corollary risk of assembly errors.

A further object of the invention is to improve the reproducibility of the orientation of the sheets. Another object of the invention is to improve the reproducibility of the orientation of sheets so that the sheets return to substantially the same position during each molding cycle, for example in a radial plane.

Another object of the invention is to provide a mold that provides excellent venting during the molding process, thanks to the venting channels and the interstices between the sheets.

BRIEF SUMMARY OF THE INVENTION

The invention proposes a mold for tire treads, comprising a laminated peripheral crown for molding the exterior of the tread, the laminated peripheral crown comprising a stack, in the circumferential direction of a plurality of thin molding elements. The elements are orientated essentially radially, the molding of the tread being carried out by the radially internal edge of the elements. The edge of the elements has a profile enabling the molding a desired pattern in the tread. At least one group of the adjacent molding elements has partial cutouts which cooperate together to form at least one venting channel.

In one embodiment, the crown of the mold is divided into sectors wherein the molding elements of each sector are attached together to form a unitary block. Each sector is able to be displaced during the movements of opening and closing the mold.

In this specification, when a component or surface is said to be 'internal', this means that it is located towards the center of the mold, i.e. on the side of the internal molding cavity. When the description 'external' is used, this means that the surface or component is located further away from the molding cavity. For example, when discussing the sheets that mold the tire tread, the internal edge of the sheets is the edge of the sheet that forms the molding surface and that is in contact with the rubber during molding. The external side, edge or border is the surface in contact with an element supporting the sheets.

The invention also covers a process of manufacturing a tire which uses a mold such as that described in this specification, and to a tire manufactured by such a process.

BRIEF DESCRIPTION OF THE DRAWINGS

The following figures illustrate the invention and bring out all is advantages.

DETAILED DESCRIPTION OF THE PREFERRED EMBODIMENTS

Figure 1:
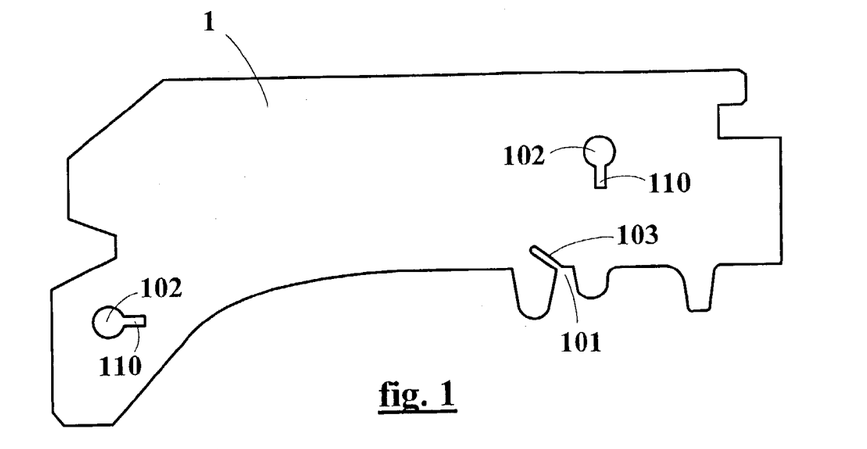
FIG. 1 is a plan view of a thin molding element according to the invention.

In one embodiment of the present invention, the molding elements of the laminated peripheral crown that serve to mold the tire tread are adjacent sheets whose thickness is between 0.1 mm (and preferably 0.5 mm) and 5 mm. FIG. 1 shows such a sheet 1. A laminated crown may comprise up to a few thousands of adjacent sheets. Obtaining them from sheets is a very advantageous way of producing the thin molding elements which characterize molds of this type.

For a general explanation of the operation of such a mold, the reader is invited to consult U.S. Pat. No. 5,492,669 mentioned earlier, and in particular the part of the patents relating to FIG. 5.

The thickness of the sheets corresponds to the resolution of the mold which defines the tread pattern. The sheets used may for example be of steel. In a preferred embodiment, the sheets are all cut out perpendicularly to their plane, along a profile dictated by the pattern elements to be produced. By cutting the sheets always perpendicularly, some surfaces of the tread pattern will have the appearance of stair treads, and this confers upon the molded tire tread an appearance which is characteristic of this technology.

As shown in FIGS. 1 to 4, the sheets 1 can comprise partial cutouts (102, 103, 104, 105, 106, 107). These cutouts are such that when the sheets are in place against one another, they form a venting channel that can connect the interior of the mold (or at least a zone close to the molding surface) to the outside of the mold. The fact that several sheets cooperate to create a channel is advantageous as it is desired that each sheet remains complete in itself and monoblock.

Moreover, this cooperation has other advantages. Distribution of the cutouts among several sheets avoids weakening any one sheet excessively relative to the others. It is also makes it possible to produce channels or parts thereof having a large cross-section without being restricted to the unitary thickness of the sheets. Venting is in this case different from that which takes place between the sheets of the molds described in U.S. Pat. No. 5,492,669 and U.S. Pat. No. 5,980,810.

The cooperation of the partial cutouts is clearly illustrated if FIGS. 1, 2, 3 and 4 are considered together. In FIG. 1, the index 103 corresponds to an example of a cutout opening onto the internal edge of the sheet, i.e. onto the molding surface of the mold. The open cutout 103 in the example of FIG. 1 allows venting of the edge of a pattern element 101 of the tire. An adjacent sheet shown in FIG. 2 has a cutout 104 connecting the open cutout 103 to the cutout 102. The connecting cutouts 104 can be of any suitable shape compatible with the manner in which they are obtained. The cutouts 102 are similar in each sheet of a given group. These common cutouts 102 are arranged opposite one another and enable the creation of a duct passing through the group of sheets in the circumferential direction in order to interconnect the venting network. The venting network is connected to the outside of the mold by extraction cutouts 105 (visible on the right of FIG. 3) arranged, in this example, in a neighboring sheet between a common cutout 102 and a central zone of the mold in which the pressure can be reduced if necessary. As has been seen, the common cutouts 102 create a connection between the various sheets of a group, in other words a sheet having an extraction cutout 105 need not be directly adjacent to the other sheets which, with it, form the venting duct. Extraction cutouts 105 can also be arranged for example at the axially external part of the sheets, opposite the corresponding common cutouts 102 (see the left-hand part of FIG. 3). The partial cutout (an open cutout 103 as shown in FIG. 1) of at least one molding element in a group of molding elements opens to the radially internal edge and extends only a portion of the distance between the radially internal edge and the radially external edge of the at least one molding element. Each molding element in the group does not have a venting channel connecting the radially internal edge and the radially external edge of the each molding element with each other. The partial cutouts in all molding elements of the group are in communication with each other to cooperate together to form a venting channel connecting the interior of the mold to the outside of the mold.

Figure 2:
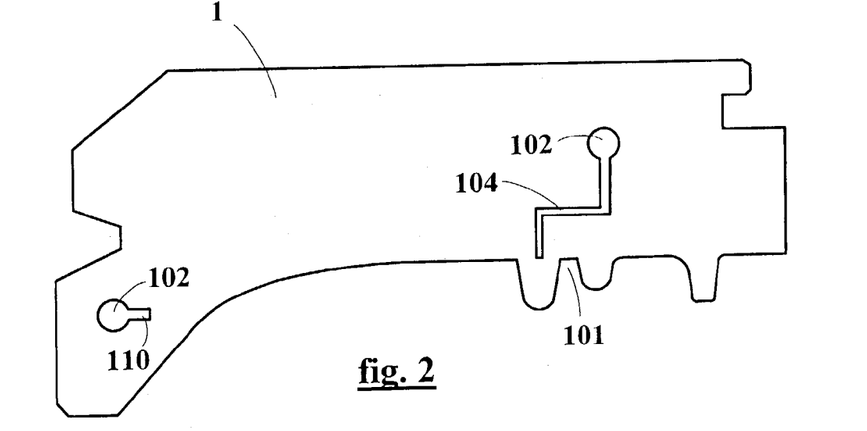
FIG. 2 is a plan view of a second thin molding element which can cooperate according to the invention with the molding element of FIG. 1.
Figure 3:
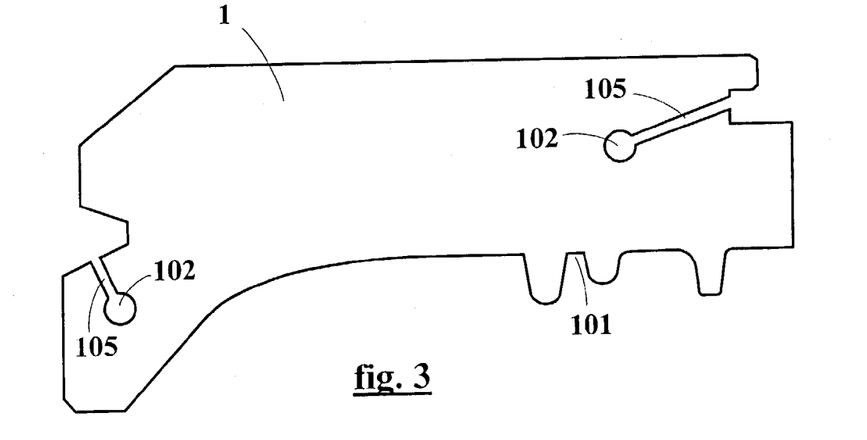
FIG. 3 is a plan view of a third thin molding element which can cooperate according to the invention with the molding elements of FIGS. 1 and 2.

It can therefore be understood that when the mold is closed, i.e. when the sheets are pressed tightly together, the stack of sheets shown in FIGS. 1, 2 and 3 produces an additional venting created by the connection of the cutouts 103, 104, 102 and 105 in that order. An advantage of the invention is that each individual sheet only has one partial cutout, which does not compromise either its integrity or its strength.

Figure 4:
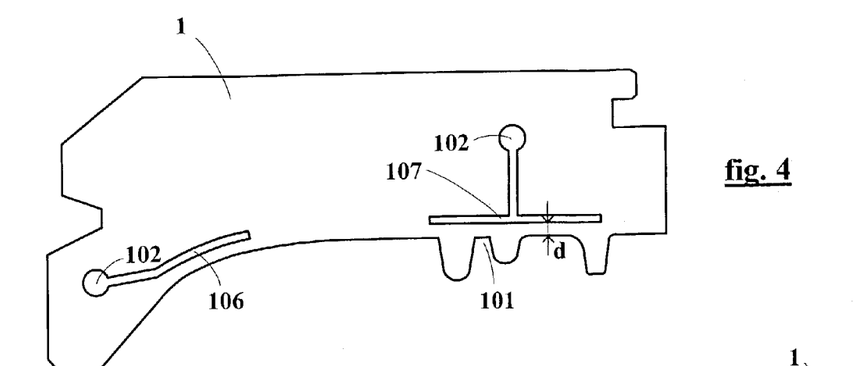
FIG. 4 is a plan view of a fourth molding element comparable to that of FIG. 2.

FIG. 4 shows another example of connecting cutouts 106 and 107 which can produce other venting network configurations according to the invention. For example, one can associate with them one or more adjacent sheets each comprising one or more open cutouts 103 according to the principle illustrated in FIG. 1.

However, according to the invention, cutouts 106 and 107 of this type can also be used in the absence of open cutouts 103 in the adjacent sheets, of the type shown in FIG. 1. In this case, the function of the cutouts 106 or 107 is to improve the venting that takes place between the sheets. Venting between the sheets is described in patent U.S. Pat. No. 5,492,669. This type of venting is improved in accordance with the present invention, in that the distance separating the interior of the mold from the cutouts 106 or 107 is smaller compared with the distance separating the internal edge from the external edge of the sheets. The cutouts 106 and 107 extend essentially along the internal edge 10 at a distance "d" from the molding surface, i.e. from the nearest part of the edge, the distance "d" being preferably at most a few millimeters instead of several centimeters as in the patent U.S. Pat. No. 5,492,669. For an equivalent flow rate, the pressure required for venting is therefore significantly reduced. Conversely, for an equivalent pressure, the venting flow rate can be higher. One of the invention's objectives, that of improving the molding quality, is therefore achieved by this arrangement. The same effect can also be used for example in order to shorten the molding time, to enable the molding of more rigid compounds, or to allow the molding of deeper tread patterns.

Figure 5A:
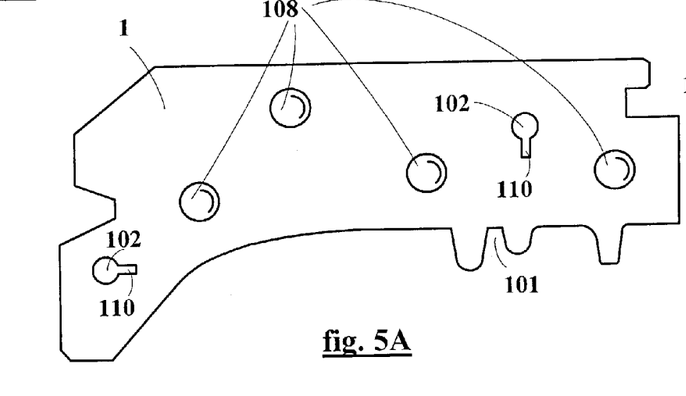
FIG. 5A shows a variant of a thin element according to the invention.
Figure 5B:
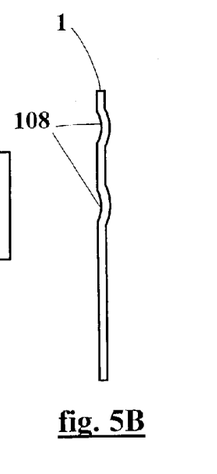
FIG. 5B is a schematic view of the profile of the element in FIG. 5A.

FIGS. 5A and 5B illustrate a preferred variant of the invention in which the thin elements 1 have deformations 108. These deformations 108 can be obtained simply by stamping in the case of sheets. The deformations constitute spring elements whose function is to push the sheets apart when the mold is opened, i.e. during each molding cycle. The effect of this is to prevent some parts of the mold from losing their venting ability as the molding cycles are repeating, due to the fact that some sheets would remain together when the mold is opened. Preferably, the deformations 108 are distributed throughout the sheets constituting the circumference of the mold so that the separation movement is substantially uniform along the circumference of the mold. To that end, for example one out of every two sheets can be so arranged. The height of the elastic deformations 108 is preferably between 0.01 and 0.1 mm.

Naturally, the invention is not limited to those particular examples. Depending on the type of tread pattern, a person versed in the art can apply the principle of the invention in many different ways so as to provide a mold consisting of stacked sheets having a venting network that created as a result of the cooperation of a plurality of cutouts distributed among a plurality of sheets.

Figure 6:
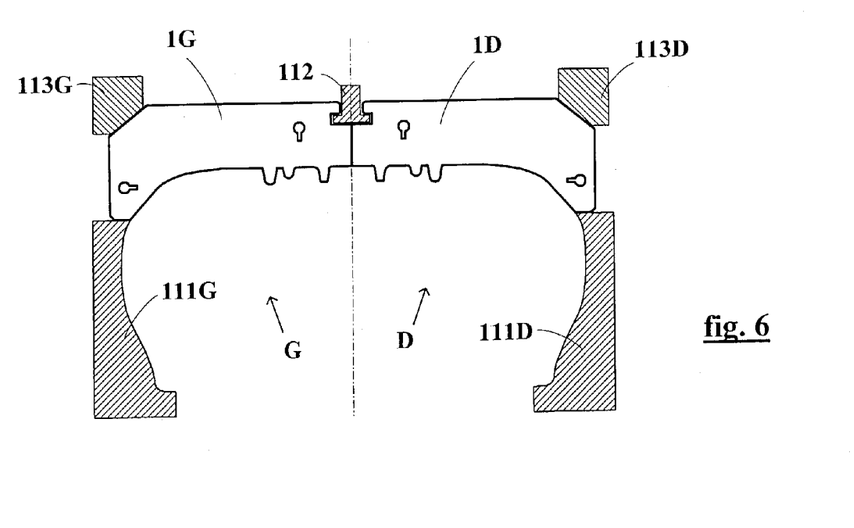
FIG. 6 is a meridian section of a mold according to the invention in its application to a first mold category.

FIG. 6 shows a meridian section through a mold according to the invention. The crown is divided into two parts (G and D) and comprises, transversely, two distinct and adjacent sheets (1G and 1D) each belonging to one of those parts. The sheets or molding elements are denoted in general by the index 1. When it is intended to denote more specifically an element or portion thereof which belongs to the part G, the index 1G is used. When the intention is to denote more specifically an element or portion thereof belonging to the part D, the index 1D is used. This mold is formed by a large number of sheets 1 such as those described earlier and by shells 111G and 111D which mold the sidewalls of the tire. The sheets rest against the shells and are guided by a belt 112 and conical hoops 113G and 113D. A single sheet which molds the full width of the tread can also replace the two sheets 1G and 1D. The operation of those different types of molds is described in the patent U.S. Pat. No. 5,492,669.

FIGS. 7 to 12 illustrate a preferred embodiment characterized by the grouping of the sheets into sub-assemblies. In these figures the cutouts described earlier are not shown. Each sub-assembly (or only a limited number of them) contains one or more sheets as described earlier, i.e. comprising partial cutouts for venting.

Figure 7:
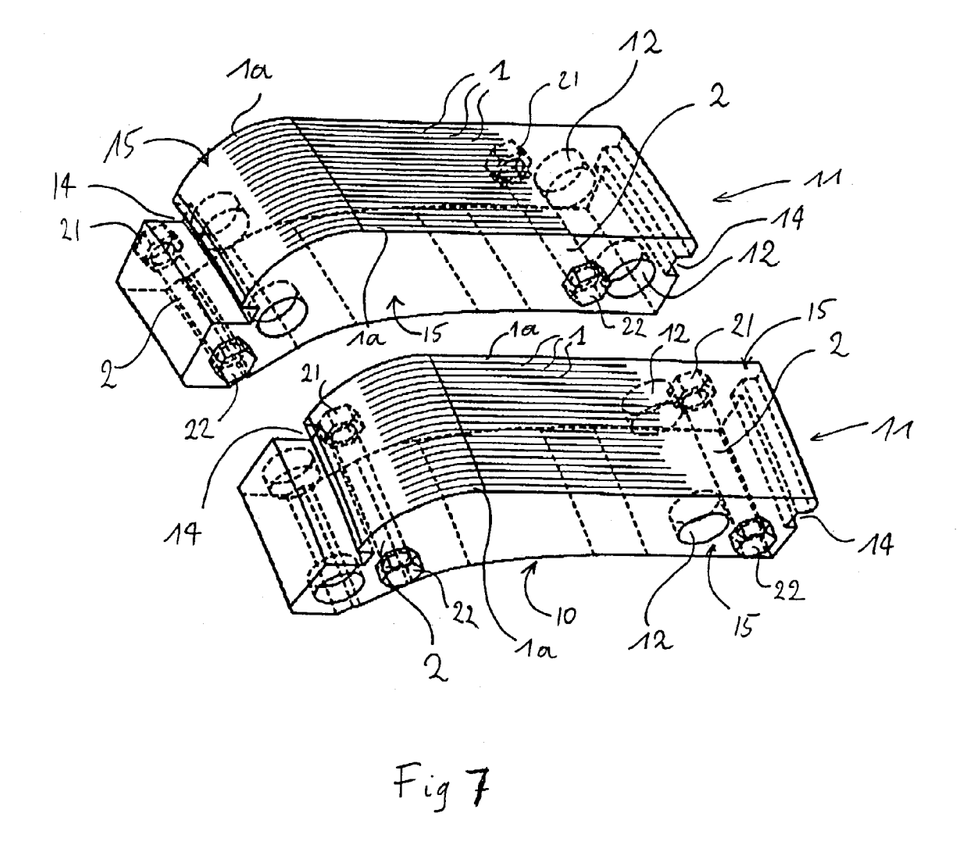
FIG. 7 is a perspective view showing two sectors spaced apart, as they could be when the mold is open, according to the invention in its application to a second mold category, showing a second variant embodiment of the invention.

FIG. 7 illustrates this principle of the invention, according to which all the thin elements 1 of the laminated crown are grouped in monoblock sub-assemblies constituting sectors 11.

Figure 8:
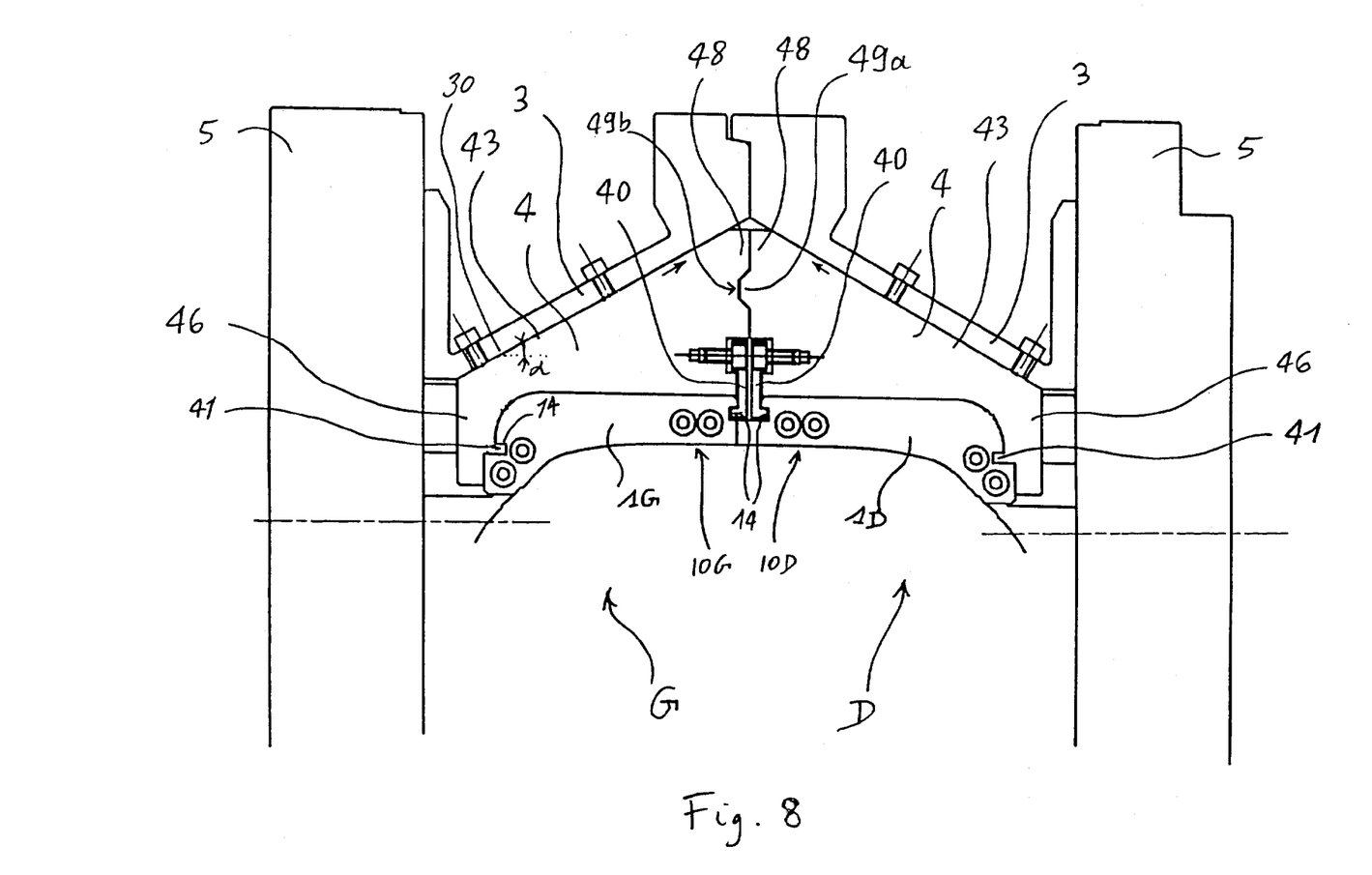
FIG. 8 is a section through a meridian plane of a mold according to the second variant of the invention, in the molding position, i.e. with the mold closed.

FIG. 8 shows that the crown is divided into two parts (G and D) and that the crown comprises, transversely, two distinct and adjacent sheets (1G and 1D) each belonging to one of those parts. The molding sheets or elements are denoted generally by the index 1.

Preferably, at least the end of the sheets 1 on the side of the molding portion, i.e. on the side of the edge 10 of the sheets, has a thickness which decreases progressively moving radially towards the axis of the mold. Thus, each sheet forms a slight taper, whose angle corresponds essentially to the value obtained by dividing 360° by the number of sheets around one circuit of the peripheral molding crown. In this way, the sheets can arrange themselves naturally in a fan shape when assembled and will have between them an essentially constant clearance. On this subject, see patent applications EP 0 916 419 and EP 0 916 421.

Figure 9:
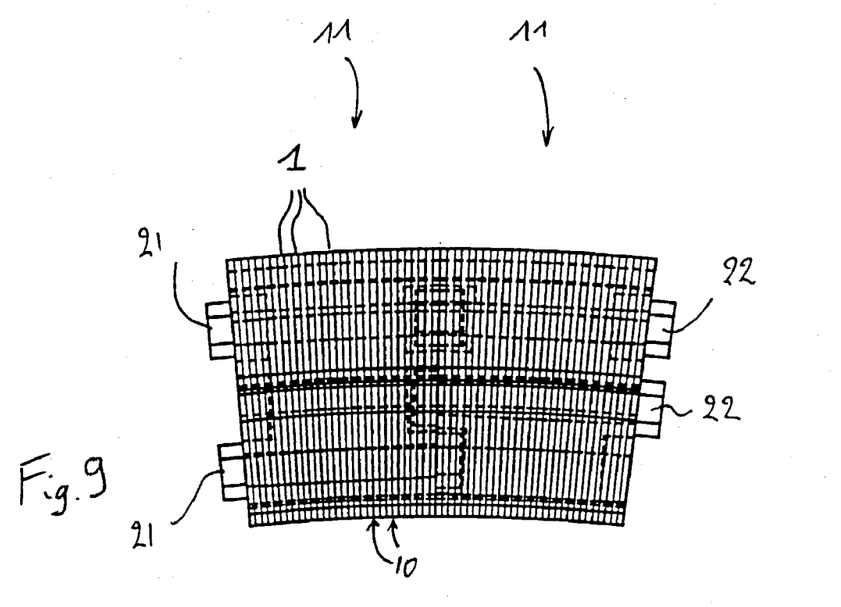
FIG. 9 is a section through a plane perpendicular to the axis, with the mold closed, showing the second variant of the invention.
Figure 10:
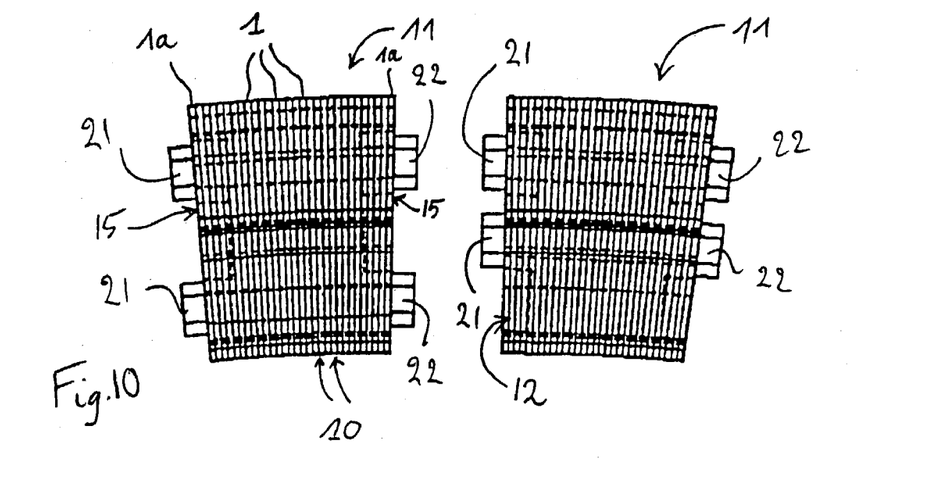
FIG. 10 is a section through a plane perpendicular to the axis, with the mold open, showing the second variant of the invention.

To form the laminated peripheral crown, the sheets 1 are grouped in sectors 11, as can be seen, for example, in FIGS. 7, 9 and 10. To that end, the sheets 1 of one sector 11 are clamped by a fixing device comprising two protruding heads, such as a bolt 2 (whose head forms a first head 21) and a nut 22 (forming the second head). The head 21 of each bolt 2 and the nut 22 rest against the free side 15 of each of the sheets 1a bordering each sector 11. The fixing devices (bolt 2 and nut 22 combinations) are arranged in alternation from one sector to the next (see FIGS. 7 and 10), each sector having recesses 12 to accommodate the head of the fixing devices of the adjacent sectors. The recesses 12 are obtained by perforating a sufficient number of sheets when the sheets are cut out. This allows the sectors to be brought into contact (see FIG. 9) to form the continuous crown that enables the tire tread to be molded.

Preferably, the fixing means are arranged in the common cutouts 102 (see FIGS. 1 to 5). In this case, the presence of a slot 110 (see FIGS. 1 to 5A) in the profile of the common cutouts 102 ensures that the circulation of the venting gases is not restricted by the fixing means of the sheet packs. In addition, the recesses 12 can be connected to the cutouts 102 to allow the venting gases to circulate from one block to the next despite the offset of the fixing means and the consequent fact that the cutouts 102 are not aligned from one sub-assembly to the next. This connection can be established by an additional cutout (not shown) which joins at least one recess 12 and one cutout 102 of at least one of the sheets contributing to the recesses 12. In passing, it is pointed out that the consequence of the type of holding means represented here is that there must necessarily be an even number of sectors to mold the tread as a whole, whether or not there are two axial parts G and D, but this is not necessarily the case for all types of holding means (see for example FIG. 12).

The number of elements per sector is typically between 10 and 1000. The number of elements can be the same in every sector, or different from one sector to another.

Various means can be used to manipulate the groups of sheets assembled together and held in sectors. This involves organizing the movements of the sectors as necessary for opening and closing the mold. For example, the sheets belonging to one sector can be fixed on a casing and each casing can be displaced during the mold opening and closing movements.

FIG. 8 shows that each sector 11 is mounted on a casing 4 forming a monoblock support, which can be a standard component common to a large number of different tread patterns. Naturally, this is only an example embodiment. Even if a casing 4 is of course generally matched to the size of a tire, since it is not itself a molding component it can be used for several different patterns and is therefore not specific to just one tire. To bring about this fixing, the sheets are cut so as to obtain grooves 14 which engage with a protuberance 41 formed on one side of the casing 4, the sector then being immobilized by a strap 40, also lodged in another groove 14 of each sheet and screwed to the casing 4. Thus, the sheets belonging to one sector 11 are fixed on one casing 4 and each casing 4 can then be displaced during the mold opening and closing movements. The number of sheets can be the same for all the sectors, or the sectors can comprise different numbers of sheets.

Besides the protuberance 41 each casing has a lateral edge 46, a back 43 and a central edge 48 designed to come into contact with the corresponding central edge 48 of the adjacent casing of the other part. Note also the presence of a pin 49a on each of the casings 4 of the part D, which engages in a cutout 49b formed in each of the casings 4 of the part G, so that the casings 4 and therefore also the sheets 1 can be positioned very precisely at the same radial height throughout the mold closing phase, above all during the final stage of closing.

Each of the casings 4 is mounted on a ramp 3 by means of a slideway (not shown), to allow a relative movement symbolized by an arrow drawn on the back of the casing. In this example each of the parts G and D of the mold has a plateau on which is mounted a ramp 3. The ramp 3 has a frustoconical bearing surface 30 of angle α, radially on the inside, in contact with the casings 4. The ramp makes it possible to control the movement of the casings 4 to bring them to their closing position, as shown in FIG. 8, or to bring them to their open position (not shown in FIG. 8, but corresponding to the groups of sheets in FIG. 10), as is known for molds with sectors in two axial parts.

In each sector the sheets 1 are mounted on the casing, being arranged all at the same angle relative to the radial direction. In this example the sheets are arranged in a meridian orientation. In other words, when the laminated peripheral crown is viewed in cross-section along a plane perpendicular to the geometrical axis of the mold (see FIG. 9), the sheets are arranged along a radius and their virtual extension contains the geometrical axis of the mold. This is in no way limiting and it is acceptable for the sheets to be somewhat inclined.

Figure 11:
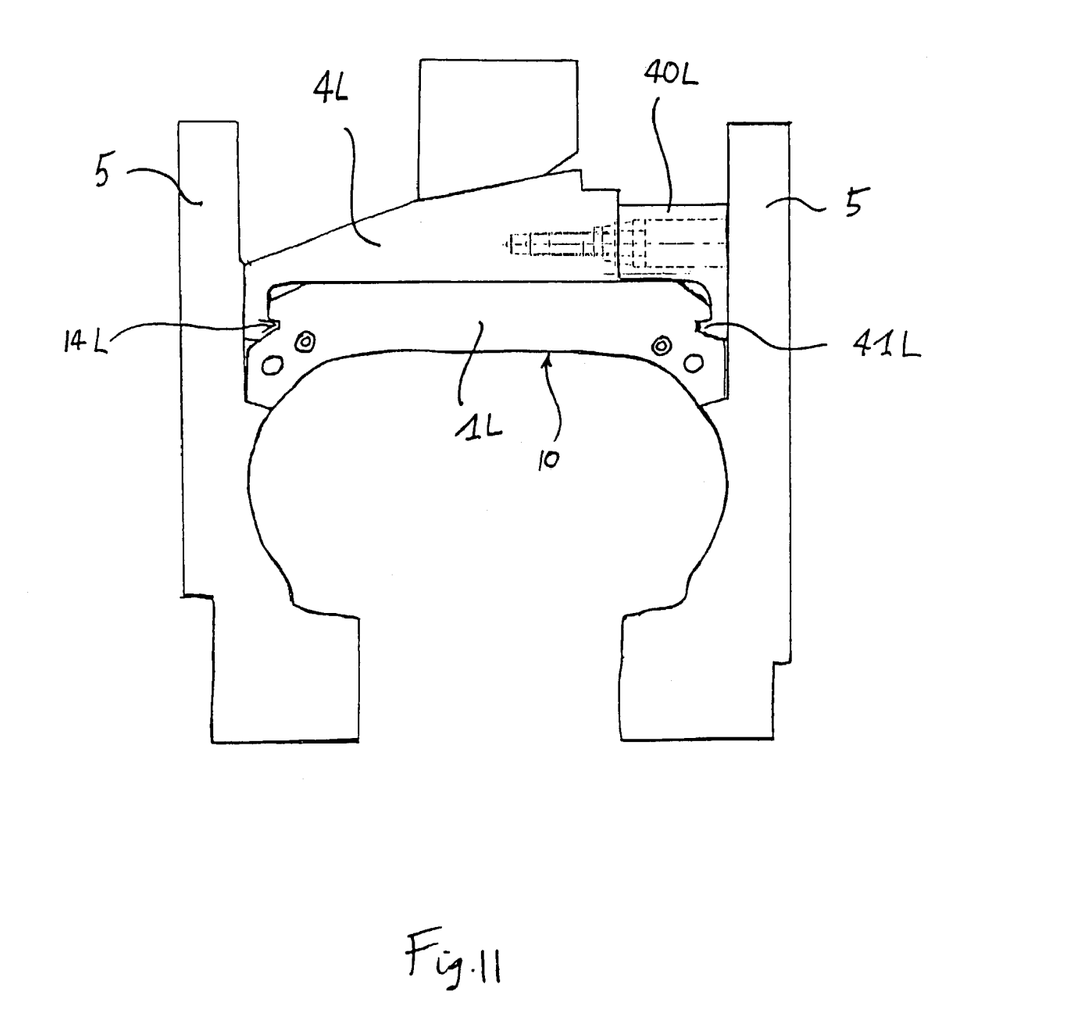
FIG. 11 is a section through a meridian plane of the mold according to the invention in its application to a third mold category, in the molding position, i.e. with the mold closed.
Figure 12:
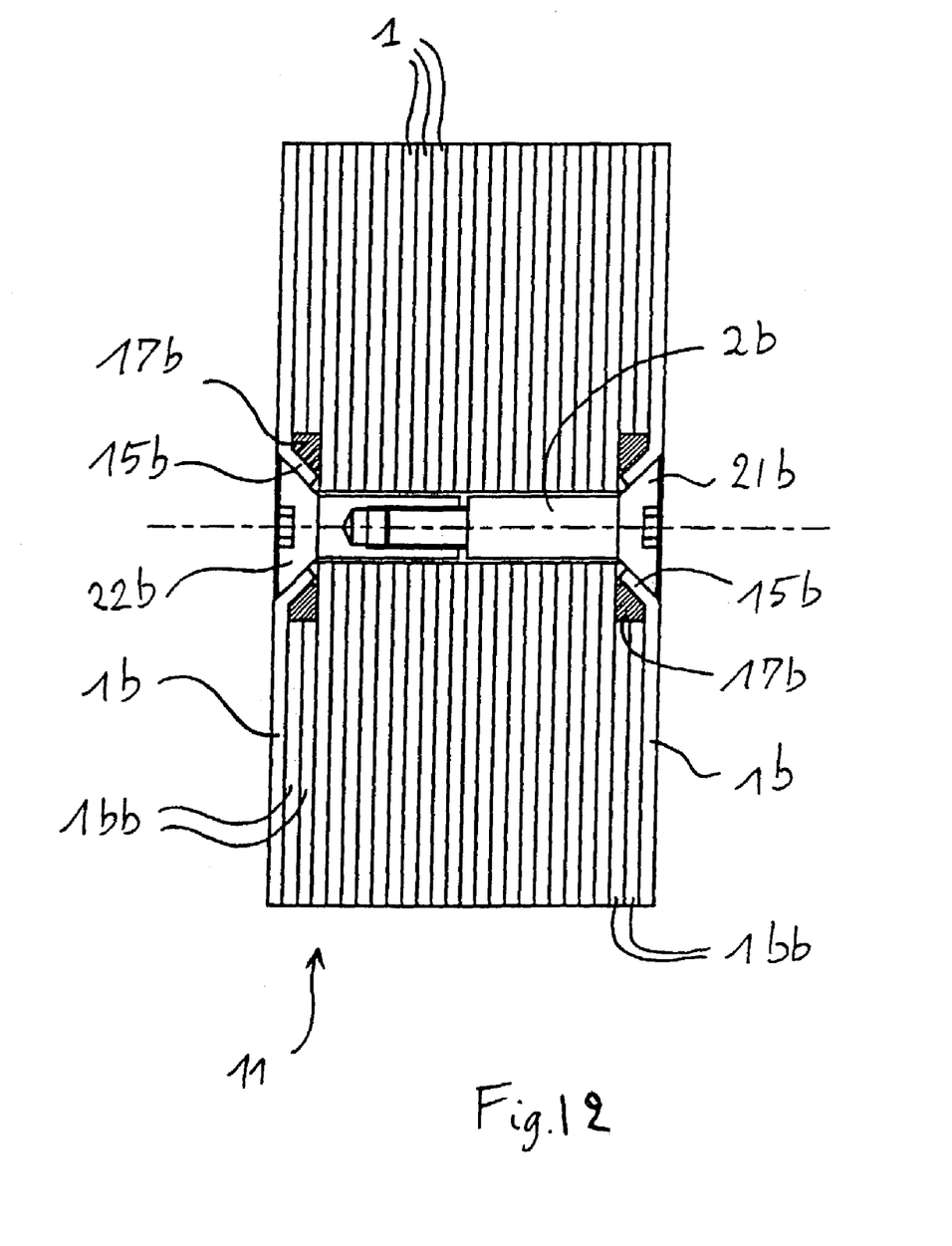
FIG. 12 shows an additional variant embodiment of the sectors according to the invention.

FIG. 11 indicates that the invention is not limited to the category of molds comprising two parts (G and D) axially, but can just as well be applied advantageously to another category of molds made axially in just one part. In this case the elements used are sheets IL whose width corresponds essentially to that of the tire tread. Each sector is mounted on a casing 4L which again forms a monoblock support, which can again be a standard component common to many different tread patterns of appropriate width. The sheets 1L are fixed by means of grooves 14L engaged with protuberances 41L formed on the one hand on the casing 4L, and on the other hand on a strap 40L screwed to the casing 4L.

Numerous variant embodiments can be envisaged for holding together the sheets 1 assembled into sectors 11. Thus, instead of the bolts 2 shown in FIGS. 7 to 10 where it is seen that the heads 21 and the nuts 22 protrude, one can for example substitute (see FIG. 12) screws 2b whose heads 21b and corresponding nuts 22b have a frustoconical shape and are sunk into the thickness of each sector, the heads 21b and nuts 22b cooperating with a frustoconical bearing surface 15b formed on the sheets 1b fitted at the boundaries of each sector. Note that in the embodiment that illustrates this document, two sheets 1bb immediately adjacent to the sheets 1b bounding the sector comprise a larger perforation, which when the mold is assembled allows a washer 17b to be accommodated which takes up the tightening forces and ensures the alignment of the sheets in the sector.

Of course, a person of ordinary skill in the art will understand that many other variant embodiments of the function of holding together the sheets of a sector are feasible, and that such embodiments also fall within the scope of the present invention.

The invention enables the fabrication of molds having very good venting ability in a way that is well suited to computer-aided design and manufacture, with very short production times. The molds so produced are very robust and can very well withstand a large number of opening and closing cycles, in particular because venting takes place at least in part through the venting channels, besides the venting taking place between the molding elements.

The molds according to the invention enable the production of tires having a quality appearance quality while reducing the maintenance required to preserve the venting ability of the mold. Furthermore, the molds enable the molding of tires whose vent mold-marks are less apparent. In effect, the molding nipples created by the open cutouts 103 (see FIG. 1) are not necessarily perpendicular to the molding surface, as is generally the case with classical (non-laminated) molds whose vents are provided as perforations through the molding elements. In contrast, in the present invention the open cutouts 103 can be orientated freely, for example in a direction close to that of the tire tread surface. It is evident that in such a case any nipples (also called "burrs") present on the finished product are less noticeable. An orientation of these nipples at an angle of less than 60°, for example 45° relative to the surface of the tire tread represents an advantageous compromise between the criteria of appearance and of mold extraction forces.

In this specification, the term "tire" applies to any type of elastic cover, whether pneumatic or not. The invention relates essentially to the molding of the "tire" and not its operation.

All documents referred to in above specification are incorporated by reference herein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A mold for a tire tread, comprising:
a laminated peripheral crown for molding an exterior of the tire tread, at least a portion of said laminated peripheral crown comprising a stack, in a circumferential direction, of a plurality of molding elements each having a radially internal edge and a radially external edge, said radially internal edge having a profile for molding a pattern on said tire tread, wherein said molding elements are oriented substantially radially,
wherein for a group of adjacent molding elements from among said plurality of molding elements, each molding element of said group comprises a partial cutout, the partial cutout of at least one of the molding elements of said group opens to the radially internal edge and extends only a portion of the distance between the radially internal edge and the radially external edge of the at least one of the molding elements,
wherein said each molding element does not have a venting channel connecting the radially internal edge and the radially external edge of said each molding element with each other, and
wherein the partial cutouts in all molding elements of said group are in communication with each other to cooperate together to form a venting channel extending entirely through said laminated peripheral crown to connect the interior of the mold to the outside of the mold, the partial cutout in each molding element of said group defining only a section of said venting channel.

2. The mold according to claim 1, wherein substantially all molding elements of said group of molding elements comprise partial cutouts circumferentially aligned with one another so as to produce an essentially circumferential duct, wherein said duct is connected to at least one extraction partial cutout of said venting channel formed in at least one of said group of molding elements and opening at the radially external edge thereof.

3. The mold according to claim 1, wherein at least some of said molding elements of said group of molding elements comprise partial cutouts extending substantially along said radially internal edge of said molding elements at a radial distance of at most 10 mm from said radially internal edge.

4. The mold according to claim 1, wherein said molding elements comprise deformations stamped therein and capable of acting as spring elements which tend to push the molding elements apart when the mold is open.

5. The mold according to claim 1, wherein the peripheral crown is divided into sectors, each sector comprising molding elements held together to form a unitary block, wherein each sector can be displaced during opening and closing movements of the mold.

6. The mold according to claim 5, wherein the molding elements belonging to each sector are fixed on a casing, and wherein said casing can be displaced during the opening and closing movements of the mold.

7. The mold according to claim 5, wherein said peripheral crown comprises a first part comprising a plurality of first circumferentially juxtaposed molding elements, and a second part comprising a plurality of second circumferentially juxtaposed molding elements, wherein said plurality of first molding elements are laterally adjacent to said plurality of second molding elements.

8. The mold according to claim 5, wherein each of said plurality of molding elements has a thickness between 0.1 mm and 5 mm and wherein said thickness decreases gradually as it progresses radially from the radially external edge of each of said plurality of molding elements toward an axis of the mold.

9. The mold according to claim 5, wherein the molding elements of each said sector are clamped together by a fixing device comprising two circumferentially spaced protruding heads, each of which rests against a free surface of each of the molding elements circumferentially bounding the sector, the fixing devices being offset from one sector to the next sector, each sector comprising circumferentially spaced apart recesses which accommodate the protruding head of the fixing devices of the adjacent sectors when the sectors are in contact to form the crown for molding the tire tread.

10. The mold according to claim 5, comprising an even number of said sectors.

11. The mold according to claim 1, wherein each of said plurality of molding elements is a metal sheet.

12. A method of manufacturing a tire, using a mold for a tire tread, said mold comprising a laminated peripheral crown for molding an exterior of the tire tread, said laminated peripheral crown comprising a stack in a circumferential direction of a plurality of molding elements each having a radially internal edge and a radially external edge, said radially internal edge having a profile for molding a pattern on said tire tread, wherein said molding elements are oriented substantially radially, wherein for a group of adjacent molding elements from among said plurality of molding elements, each molding element of said group comprises a partial cutout, the partial cutout of at least one of the molding elements of said group opens to the radially internal edge and extends only a portion of the distance between the radially internal edge and the radially external edge of the at least one of the molding elements, wherein said each molding element does not have a venting channel connecting the radially internal edge and the radially external edge of said each molding element with each other, and wherein the partial cutouts in all molding elements of said group are in communication with each other to cooperate together to form a venting channel extending entirely through said laminated peripheral crown to connect the interior of the mold to the outside of the mold, the partial cutout in each molding element of said group defining only a section of said venting channel, said method comprising venting the mold at least in part through the venting channel.

13. A mold for a tire tread, comprising:
a laminated peripheral crown for molding an exterior of the tire tread, said laminated peripheral crown comprising a stack in a circumferential direction of a plurality of thin molding elements each having a radially internal edge, said radially internal edge having a profile for molding a pattern on the tire tread, wherein said molding elements are oriented substantially radially, and wherein said molding elements comprise partial cutouts which cooperate together to form a venting channel;
wherein the peripheral crown is divided into sectors, each sector comprising molding elements held together to form a unitary block, wherein each of said sectors can be displaced during opening and closing movements of the mold; and
wherein the molding elements of each of said sectors are clamped together by a fixing device comprising two protruding heads, each of which rests against a free surface of each of the molding elements bounding the sector, the fixing devices being arranged in alternation from one sector to the next sector, each sector comprising recesses which accommodate the protruding head of the fixing devices of the adjacent sectors when the sectors are in contact to form the crown for molding the tire tread.

* * * * *